United States Patent
Hwang et al.

(10) Patent No.: US 11,758,419 B2
(45) Date of Patent: Sep. 12, 2023

(54) SERVICE TYPE IDENTIFICATION SYSTEMS AND METHODS FOR OPTIMIZING LOCAL AREA NETWORKS

(71) Applicant: ASSIA SPE, LLC, Redwood City, CA (US)

(72) Inventors: Chan-Soo Hwang, Seoul (KR); Haleema Mehmood, Redwood City, CA (US)

(73) Assignee: ASSIA SPE, LLC, Wilmington, DE (US)

( * ) Notice: Subject to any disclaimer, the term of this patent is extended or adjusted under 35 U.S.C. 154(b) by 0 days.

(21) Appl. No.: 17/583,112

(22) Filed: Jan. 24, 2022

(65) Prior Publication Data
US 2022/0150729 A1    May 12, 2022

Related U.S. Application Data

(63) Continuation of application No. 16/709,857, filed on Dec. 10, 2019, now Pat. No. 11,234,140.

(60) Provisional application No. 62/778,153, filed on Dec. 11, 2018.

(51) Int. Cl.
*H04W 84/12*    (2009.01)
*H04W 24/02*    (2009.01)

(52) U.S. Cl.
CPC ............ *H04W 24/02* (2013.01); *H04W 84/12* (2013.01)

(58) Field of Classification Search
CPC ..... H04W 24/02; H04W 84/12; H04W 24/10; H04W 48/08; H04L 29/06; H04L 45/52; H04L 65/105; H04L 9/08; H04L 12/24
See application file for complete search history.

(56) References Cited

U.S. PATENT DOCUMENTS

2008/0155087 A1    6/2008    Blouin et al.
2014/0295872 A1    10/2014    Chang et al.
(Continued)

FOREIGN PATENT DOCUMENTS

CN    103200133 A    7/2013

OTHER PUBLICATIONS

Australian office action dated May 4, 2022 in related Australian patent application No. 2019396431, (2pgs).
(Continued)

*Primary Examiner* — Chuong A Ngo
(74) *Attorney, Agent, or Firm* — North Weber & Baugh LLP; Michael North (57) ABSTRACT

Presented are methods and systems for a software agent in an AP to recognize a service type used by a wireless communication station and optimize the wireless communication network's operation. Methods comprise acquiring communication status from a communication apparatus that may comprise a wireless communication station, a wireless LAN, wired LAN, and/or a broadband connection; learning a classifier that maps the acquired communication status to service types by analyzing historical communication status; and recognizing the service type of a wireless communication station by inputting a current communication status to the classifier. The recognized service type may be used to diagnose the operation of communication networks and stations coupled to the AP and to optimize the operation of such communication networks and stations.

20 Claims, 8 Drawing Sheets

(56) References Cited

U.S. PATENT DOCUMENTS

2016/0112894 A1* 4/2016 Lau .................. H04W 24/10
370/252
2018/0198838 A1* 7/2018 Murgia .............. H04L 47/2491

OTHER PUBLICATIONS

Canadian office action dated May 20, 2022 in related Canadian patent application No. 3,117,055, (4 pgs).
Response to Canadian office action filed Sep. 20, 2022 in related Canadian patent application No. 3,117,055, (8 pgs).
European office action dated Jul. 28, 2022 in related European patent application No. 19897439.6, (14 pgs).
Orsolic et al: "A machine learning approach to classifying YouTube QoE based on encrypted network traffic", Multimedia Tools and Applications, Kluwer Academic Publishers, Boston, US, vol. 76, No. 21, May 6, 2017 (May 6, 2017), pp. 22267-22301, XP036336351, ISSN: 1380-7501, DOI: 10.1007/11042-017-4728-4 (2 pgs).
Nikravesh Ashkan et al: "QoE Inference and Improvement Without End-Host Control", 2018 IEEE/ACM Symposium on Edge Computing (SEC), IEEE, Oct. 25, 2018 (Oct. 25, 2018), pp. 43-57, XP033468901, DOI: 10.1109/SEC.2018.00011, (15 pgs).
Ingh Hardeep: "Performance Analysis of Unsupervised Machine Learning Techniques for Network Traffic Classification", 2015 Fifth International Conference on Advanced Computing & Communication Technologies, IEEE, Feb. 21, 2015 (Feb. 21, 2015), pp. 401-404, XP032760078, DOI: 10.1109/ACCT.2015.54, (2 pgs).
European office action dated Mar. 22, 2023, in related European patent application No. 19897 439.6, (2 pgs).
Response to European office action filed May 30, 2023 in related European patent application No. 19897 439.6, (5 pgs).
Canadian office action dated Apr. 14, 2023 in related Canadian patent application No. 3,117,055, (4 pgs).
Response to Canadian office action filed May 4, 2023 in related Canadian patent application No. 3,117,055, (4 pgs).

* cited by examiner

SERVICE TYPE IDENTIFICATION SYSTEMS AND METHODS FOR OPTIMIZING LOCAL AREA NETWORKS

CROSS REFERENCE TO RELATED PATENT APPLICATIONS

The present application a continuation of and claims priority benefit, under 35 U.S.C. § 120, to commonly-assigned U.S. patent application Ser. No. 16/709,857, entitled "Service Type Identification Systems and Methods for Optimizing Local Area Networks", filed on Dec. 10, 2019, listing as inventors Chan-Soo Hwang and Haleema Mehmood, and it claims priority benefits to the U.S. patent application Ser. No. 62/778,153, entitled "Service Type Identification Systems and Methods for Optimizing Local Area Networks", filed on Dec. 11, 2018, listing as inventors Chan-Soo Hwang and Haleema Mehmood. Each reference mentioned in this patent document is incorporated by reference herein in its entirety and for all purposes.

BACKGROUND

A. Technical Field

The present disclosure relates generally to systems and methods for communication systems. More specifically, present disclosure relates to methods and systems for improving wireless local area network (LAN) operation using types of services used by a station and identified based on, e.g., communication status data collected at an access point (AP).

B. Description of the Related Art

The service type of an Internet protocol (IP) data flow is commonly identified by using the information specified in the IP header, such as a destination IP address or port number, since different services are served by different IP addresses or use specific port numbers. For example, if a simple mail transfer protocol uses TCP/UDP port 25, a flow using TCP/UDP port 25 may thus be identified as an e-mail service. In modern Internet applications, it is difficult to accurately identify the service type of a flow based on IP header information since a server having a particular IP address may host different services, and different types of services are provisioned using HTTP(S) and, thus, share the same port number. As a result, IP address may not be sufficient to uniquely identify a service. To overcome this problem, one commonly used approach for identifying the service type employs deep packet inspection (DPI), which inspects the payload section of an IP packet. For example, if the host name in an IP packet payload, such as host name specified in the HTTP header, matches that of a streaming video site, the service type of the flow is identified as streaming video. However, the use of DPI often raises privacy concerns since DPI may uncover private information, such as websites address, payment method, and any unencrypted messages in the payload. Contrariwise, if the payload is encrypted, e.g., using VPN, proxy, or HTTPS, then DPI is unable to determine the type of the service.

Some other approaches identify the service type of an IP data flow by inspecting traffic patterns, such as bandwidth consumption and session length. Since the service type is identified per flow, the service type identification method uses IP address and port number as an ID for the flow. When the service host uses a content distribution network (CDN), the service from a host may be delivered from various different IP addresses, and many unique flows exist for a given service. Similarly, when a particular service, e.g., video streaming, is offered by several service providers, there exist many unique flows for that type of service. Therefore, service type identification per flow may lead to inaccurate results. Moreover, traffic patterns observed at the source or final destination are affected not only by service type but also by network performance between source and destination. Accordingly, what is needed are systems and methods that overcome the shortcomings of existing service type identification approaches.

SUMMARY

Presented herein are methods and systems that enable recognizing service types used by, e.g., a wireless communication station or an access point (AP). Certain methods comprise acquiring communication status from communication apparatus that may comprise a wireless communication station, a wireless or wired LAN, and a broadband connection; learning a classifier that maps the acquired communication status to service types, e.g., by analyzing historical communication status; and recognizing the service type of a wireless communication station by inputting a current communication status to the learned classifier. In embodiments, the communication status comprises the traffic usage per station, such as bandwidth consumption of the station, communication characteristics per station, e.g., the receive signal strength indicator (RSSI) of a Wi-Fi connection of the station, the network traffic usage, such as bandwidth consumption by all stations coupled to a network interface, and network communication characteristics, such as a downstream bandwidth of a broadband connection. In embodiments, the communication characteristics may comprise the location of the station and the type of the wireless communication station.

In embodiments, the quality of experience (QoE) of the recognized service type may be analyzed, e.g., by grouping the communication status by the service type and analyzing the grouped communication status to estimate the QoE. In embodiments, a profile, which may comprise a number of rules that determine a number of operational parameter of the AP, may be optimized, e.g., by using a historic communication status and/or information that may have been derived from such historic communication status. In embodiments, the operational parameters of the AP comprise a frequency band, a station priority, a frequency channel, a transmit power, a resource unit (RU) allocation, a clear-channel-assessment (CCA) threshold, data regarding handover to nearby APs, and AP placement at certain locations. In embodiments, more than one AP may be placed in a LAN, and the operational parameters of an AP may comprise network topology information regarding connectivity between APs and stations.

DETAILED DESCRIPTION OF EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the present disclosure and are meant to avoid obscuring the invention. It shall also be understood that throughout this discussion components may be described as separate functional units, which may comprise sub-units. Those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the present disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

It shall also be noted that embodiments described herein are given in the context of computer algorithms that use programming language to execute steps, but one skilled in the art will recognize that the teachings of the present disclosure are not limited to software applications and may equally be implemented in hardware, e.g., using sate machines.

Embodiments of the present disclosure relate to methods and systems for a communication apparatus, such as an access point, a remote server, or a wireless station, that recognizes a service type for the communication apparatus, e.g., by using the communication state of network interfaces that comprises both communication characteristics and traffic patterns. The communication apparatus/station may receive various types of services, such as voice-over-IP (VoIP), IPTV, streaming video, video conferencing, web-browsing, and other services that use network connections. A service type such as a streaming video service may be provided by any number of service providers. The communication state may comprise traffic usage and communication characteristics. Examples of traffic usage comprise number of transmitted byte, average packet size, traffic session duration, periodicity, inter-arrival time of communication burst, and metrics that may quantify traffic and traffic patterns. Example of communication characteristics comprise RSSI, transmission rate, round-trip-time (RTT), one-way delay, queue state, location of the communication sender/receiver, and other metrics that may quantify the characteristics of the communication independent of actual usage of the communication system. Various embodiments of the present disclosure aid in optimizing an AP's operation based on recognized service types and communication states, including historical communication states.

Figure 1:
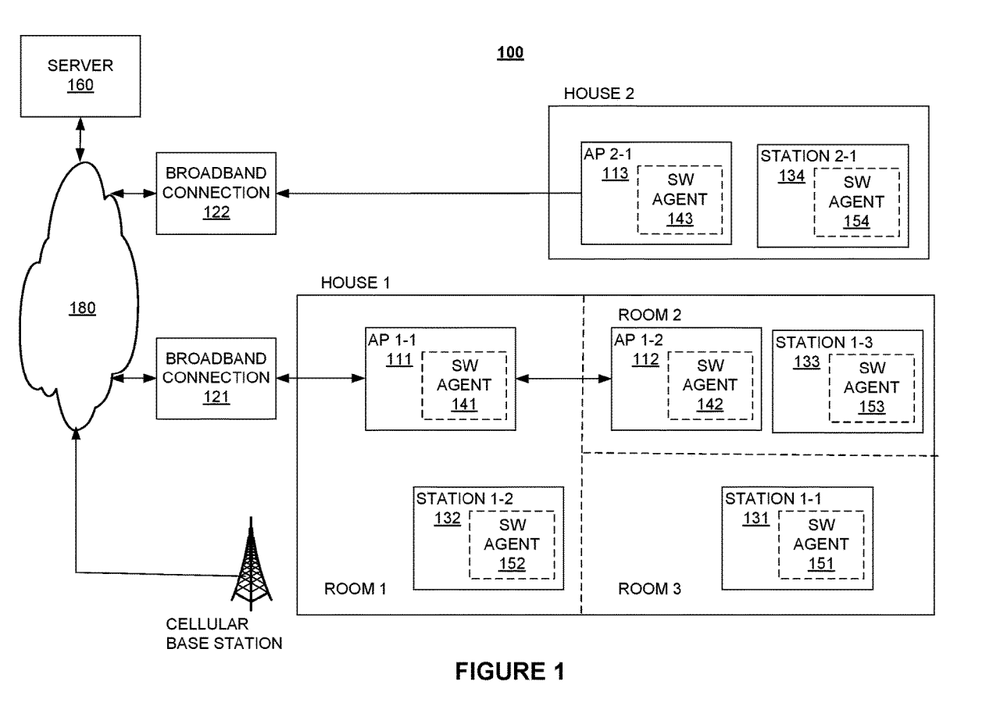
FIG. 1 illustrates a system for recognizing service types for connected stations according to embodiments of the present disclosure.

FIG. 1 illustrates a system for recognizing service types for connected stations by using communication states of network interfaces according to embodiments of the present disclosure. In embodiments, system 100 comprises server 160, communications network 180, a cellular base station, broadband connections 120, access points 110, software agents 140, and stations 130. One or more access points and stations may be located at various locations (e.g., in different rooms of house 1). As depicted in FIG. 1, in house 1, access point 111 may be connected to Internet 180 through broadband connection 121. Software agent 141 within AP 111 may communicate with server 160 via Internet 180, and one or more stations 130 may communicate with AP 111. In a large house, there may be secondary AP 112 that may communicate with nearby stations that otherwise may have difficulty communicating with primary AP 111. Secondary AP 112 is often called a repeater and may be connected to the Internet via primary AP 111. The connection between AP 111 and AP 112 may be wireless (e.g., Wi-Fi) or wired (e.g., Ethernet, PLC, or MoCA). Stations 130 may connect to Internet via cellular base station 170, which may use a wireless communication technology, such as WCDMA, HSDPA, LTE, 5G, and other communication standards known in the art, e.g., communication standards used by smart phone and other mobile devices.

In FIG. 1, AP 113 in house 2 is connected to the Internet 180 via broadband connection 122. Station 134 is connected to AP 113 and is in proximity to AP 112 and station 133; therefore, the communication between AP 113 and station 134 may interfere with a communication between AP 112 and station 133 and vice versa. A user may relocate or move a station 131-134 to a different location within a house, for example, if station 132 is moved from room 1 to room 2, station 132 may have better communication with AP 112 than with AP 111.

In certain scenarios, a user's behavior while using a particular station may be indicative of the types of service the station provides. For example, a user who watches streaming video using station 132 is more likely to remain at the same location in room 1, e.g., sitting on a sofa and is, thus, less likely to move around or leave room 1. As a result, the likelihood that that the best AP will change during the service, e.g., from AP 111 in room 1 to AP 112 in room 2, is relatively low. On the other hand, in scenarios when the user uses a VoIP service, is becomes much more likely that the user will move around the house. In such instances, the quality of experience (QoE) may sometimes be improved by connecting station 132 to a different network interface having a larger signal strength or wider range.

In addition, a type of communication characteristics that affects QoE may change depending on the type of service the user receives. For example, when a user watches streaming video with a large receive buffer using TCP, then the QoE will depend on the bandwidth of the communication system. However, if the user watches a real-time IPTV without a large receive buffer using UDP, the QoE will depend on delay jitter and packet loss. Therefore, in embodiments, to improve the QoE of a station, SW agent 152 may utilize information obtained regarding the type of service to determine optimized operational AP parameters associated with one or more stations.

Figure 3:
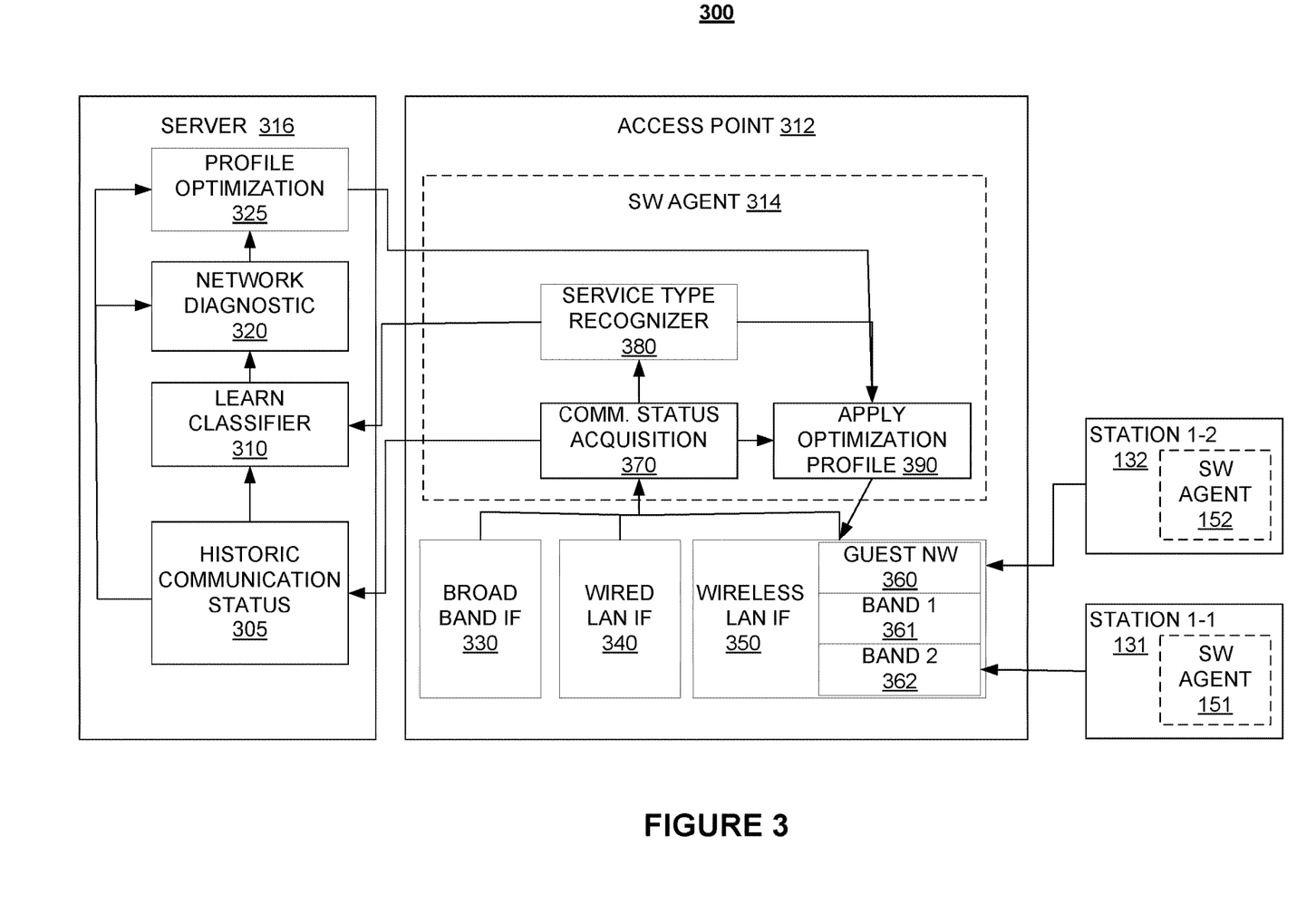
FIG. 3 is an illustrative block diagram for a service type identification and wireless LAN optimization system according to various embodiments of the present disclosure.

FIG. 3 is an illustrative block diagram for a service type identification and wireless LAN optimization system according to various embodiments of the present disclosure. System 300 comprises server 316 and AP 312 that is communicatively coupled with stations 130. Server 316 may comprise a database comprising historic communication status 305, learn classifier unit 310, network diagnostic unit 320, and profile optimization unit 325. In embodiments, database 305 may comprise historic communication status for AP 312.

In embodiments, wireless communication station 131, 132 may comprise respective SW agent 151, 152 that comprises communication status acquisition unit 370, apply optimization profile unit 390, and service type recognizer 380. In this embodiment, wireless station 131, 132, may communicate with AP 312 instead of with other wireless communication stations.

In embodiments, AP 312 may comprise network interfaces, such as broadband interface 330, wired LAN interface 340, and wireless LAN interface 350. Wireless LAN interface 350 may comprise guest network interface 360, low frequency band interface 361, such as 2.4 GHz Wi-Fi, 900 kHz Wi-Fi, 2.4 GHz ZigBee, 900 MHz ZigBee, and 2.4 GHz Bluetooth, and high frequency band interface 362, such as 5/6 GHz Wi-Fi or 60 GHz Wi-Fi interfaces. In embodiments, guest network interface 360 may be logically separate from other network interfaces yet physically share a network interface 362 or 361. Stations 130 may be coupled to AP 312 using various LAN interfaces. For example, station 132 may be coupled to guest network interface 360 and station 131 may be coupled high frequency band interface 362.

It is noted that system 300 illustrated in FIG. 3 is not limited to the detail shown there or described in the accompanying text. For example, as those skilled in the art will appreciate, service type recognizer 380 may be embedded in remote server 316. In embodiments, software agent 314 may be implemented within a wireless communication station. In such embodiments, the wireless communication station may monitor its own communication status and have access to the historic communication status of other wireless communication stations in a network, such that software agent 314 in AP 312 may recognize the service type similar to software agent 151, 152.

In operation, communication status acquisition unit 370 may obtain communication status data from broadband interface 330, wired LAN interface 340, guest network interface 360, low-frequency band wireless LAN interface 361, and/or high-frequency band wireless LAN interface 362. The communication status data may be processed and transmitted to database 305, e.g., in server 316.

In embodiments, server 316 may use learn classifier unit 310 to learn a set of classifiers that may be used to generate and train a model that service type recognizer 380 in SW agent 314 may use to map acquired communication status to service types, e.g., by analyzing historical communication status. Server 316 may then deliver the learned classifier to service type recognizer 380 that, in embodiments, may be used to recognize the service type of a wireless communication station by inputting current communication status to a trained model to obtain the service type. In embodiments, learn classifier unit 310 may provide recognized service types to network diagnostic unit 320.

Network diagnostic unit 320 may use both recognized service type and communication status received from database 305 to diagnose communication interfaces 330-360 in AP 312, comprising broadband interface 330, wired LAN interface 340, wireless guest network interface 360, low-frequency wireless network interface 361, and high-frequency wireless network interface 362.

In embodiments, profile optimization unit 325 may use both the diagnostics result from network diagnostic unit 320 and the communication status from database 305 to derive a profile that comprises a set of rules that may be used to determine an improved configuration for operating APs in a network. An exemplary rule may comprise using a max/min RSSI to determine to which AP to connect to. Apply optimization profile unit 390 in AP 312 may use any combination of the current communication status received from communication status acquisition unit 370, the current service type from 380, and the optimized profile from profile optimization unit 325 to apply the optimal configuration to the communication interfaces 330-360. For example, RSSI may be used to represent a current communication status from which it may be determined which AP to connect to, based on a profile that comprises a threshold value for min/max RSSI.

In embodiments, the communication status may comprise a traffic usage per station, communication characteristics per station, network traffic usage, and network communication characteristics. In this context, traffic usage per station refers to traffic usage of each station and comprises at least one of a number of bytes sent by a station, a number of bytes sent to a station, the timestamp and size of packets sent by a station, a timestamp and size of packets sent to the station, a number of bytes sent by a station using a certain QoS queue, a number of bytes sent to a station using a certain QoS queue, a DNS request from the station, a DNS response to a station, DPI results of a packet sent by the station, DPI results of packets sent to the station.

In embodiment, numerous pieces of information may be utilized for detecting and recognizing service types. In wireless LANs, for example, four QoS queues correspond to background traffic, best effort traffic, video traffic, and voice traffic. Information regarding the destination where a packet arrives may also aid in recognizing the service type. DNS requests from a station and DPI output contain host names. As an example, if a packet is labeled as video traffic, that packet is likely to contain such video traffic. DPI may reveal the service type based on upper layer information. A DNS lookup will reveal a URL, and so on.

The network traffic usage is the sum of traffic usages from all stations coupled to a certain communication interface. For example, the network traffic usage of a broadband interface may be viewed as the sum of traffic from all stations connected to a particular AP, whereas the network traffic usage of a guest network may be viewed as the sum of traffic from all guest stations. A person of skill in the art will appreciate that different and/or additional data from various sources may be used for the purpose of recognizing a service type.

In embodiments, network traffic usage is examined to understand the volume of traffic between different network interfaces to help identify the location of a congestion. In embodiments, network traffic usage comprises at least one of the number of bytes sent by the AP to all stations in one of the network interfaces, the number of bytes sent to the AP by all stations in one of the network interfaces, the timestamp and size of packets sent by the AP to all stations in one of the network interfaces, the timestamp and size of packets sent to the AP by all stations in one of the network interfaces, the number of bytes sent by the AP to all stations in one of the network interfaces using a certain QoS queue, and the number of bytes sent to the AP from all stations in one of the network interfaces using a certain QoS queue.

In embodiments, the communication characteristics per station may be a set of communication characteristics that are specific to a given station. For example, in wireless LAN, the transmission speed between AP and station may be adjusted for each station, whereas the transmission channel from AP to station may not be adjusted for each station. Therefore, transmission rate or throughput may be used as a type of communication characteristic per station, and the AP channel may be viewed as a type of network communication characteristic. In embodiments, the communication characteristics per station may be used to recognize the service type and help to diagnose that a network problem is associated with a particular station. In embodiments, the communication characteristics per station comprises at least one of a RSSI of the wireless station, a MAC address, a transmission rate of the communication between the AP and the station, a packet loss rate of the station, a round-trip-delay between the AP and the station, a transmission mode, a number of DNS fails, a number of authentication/association fails, a number of disconnections, and a number of dynamic host configuration protocol (DHCP) fails.

In embodiments, the network communication characteristics may be used to diagnose a network problem that affects any number of stations coupled to an interface, e.g., if the AP will be affected by a problem at the interface. In embodiments, the results of the diagnosis may be used to optimize communication configurations for one or more network interfaces, e.g., by changing a channel. In embodiments, network communication characteristics comprise at least one of a congestion level of a channel used by one of the network interfaces in the AP, a congestion level of a channel currently not used by one of the network interfaces in the AP, a status of transmission queues, and a communication characteristic in 5 aggregated over all stations in one of the network interfaces in the AP. In this context aggregation refers to obtaining a value that summarizes the values of all stations. For example, the aggregated RSSI may be the average RSSI of all stations. In another example, the aggregated data rate may be the sum of data rates of all stations.

In embodiments, a congestion level of a channel may be measured by clear-channel-assessment (CCA) counters or other cast (Ocast) counters provided by a Wi-Fi network interface. In embodiments, the CCA counter measures the amount of time that the communication was deferred because the clear-channel-assessment was negative. In embodiments, an Ocast counter measures the number of successfully received packets whose destination address was not the AP.

In embodiments, communication status acquisition unit 370 may acquire a communication status at predetermined, e.g., periodic, or random time intervals. In embodiments, a change in communication status may be defined as a communication status deviating from a prior communication status by more than some predetermined threshold. For example, once the average number of transmitted bytes per minute changes from 22.5 MB (3 Mbps) to 7.5 MB (1 Mbps) during the streaming by a video service, it is more likely that a video streaming quality has changed from HD to SD. Therefore, in embodiments, a detected change in communication status may be used to initiate increased data collection so as to verify that the status change is due to a service type change rather than due to a potential communication problem.

In another example, if the average number of transmitted bytes per minute increases from 0.1 MB to 7.5 MB, it is more likely that the station started a new service. Therefore, in embodiments, this type of change may be used to trigger data collection for a service type recognition process. In other words, once an idle station commences using a service, an increase in bytes transmitted and received would be expected, such that if an agent is alerted at such time it may start collecting information, e.g., information from which features for a classification model may be derived.

In embodiments, acquired communication status metrics are further processed, e.g., by communication status acquisition unit 370, to derive features employed in classification. In embodiments, communication status acquisition unit 370 supplies communication information to service type recognizer 380 such that service type recognizer 380 may recognize service types, e.g., based on using a classifier supplied by learn classifier unit 310. Therefore, in embodiments, communication status acquisition unit 370 provides information to service type recognizer 380 that derives the features based on the communication status.

In embodiments, where server 316 is located remotely, communication status acquisition unit 370 may reduce the amount of data communication transmitted to server 316 by using statistical methods applied to data obtained by communication status acquisition unit 370. In embodiments, such statistical methods may comprise any combination of average, variance, standard deviation, ratio between two metrics, spectrum analysis such as Fourier transform, cross correlation coefficient, auto correlation, percentile, median, order statistics such as largest or smallest number, histogram, other statistical processing methods that may be used to reduce the data size, such that, e.g., instead of uploading 100 samples of a certain metric for transmission to server 160, only an average of those 100 samples can be uploaded.

In embodiments, learn classifier unit 310 learns a classifier following the steps of preprocessing the communication status; generating a classification model using an unsupervised learning method; and simplifying a classification model using a supervised learning method. In embodiments, preprocessing of the communication status may comprise a noise reduction process, such as low-pass filtering, moving average, regression, median filter, clipping, limiting, and other signal processing methods. In addition, the preprocessing of the communication status may comprise segmentation that divides the time-series of communication status into a number segments. In embodiments, the time-series is segmented when at least one of the communication status changes by more than a pre-set threshold.

In embodiments, the communication status may be further processed by feature extraction processes comprising at least one of: selection of relevant metrics from communication status, normalization of the communication status metrics, or projection of a vector of communication status metrics into a vector having a lower dimension, e.g., by using techniques such as principal component analysis. Then, an unsupervised learning method may use the processed communication status to learn the initial classification model. Unsupervised learning does not require that the collected data is labelled with the true service type and produces an unsupervised learning model that maps the communication status to a service type. After the unsupervised learning model converges, learn classifier unit 310 may forgo the unsupervised learning step by using the previously learned unsupervised learning model to process newly collected data. In embodiments, if an unsupervised learning model is available for the same type of data and similar communication conditions from another network, learn classifier unit 310 may forgo the unsupervised learning step by using the unsupervised learning model from the other network. In embodiments, communication condition may be a function of communication channel status and network communication characteristics. For example, congestion involves a communication condition where network communication utilization exceeds the bandwidth that the communication characteristics can support. In another example, interference involves a communication condition where a number of interferences from neighboring wireless networks may exist. In embodiment, the unsupervised model from another network or other stations may be used as an initial point for the unsupervised learning training process so as to expedite the learning process.

In embodiments, when the preprocessing steps include segmentation, features may be extracted for segments and then clustering algorithms, such as k-means or DBSCAN, may be used to derive a model. In embodiments, an unsupervised learning method may comprise a Hidden-Markov Model (HMM) method in which the states of HMM correspond to traffic types and/or communication conditions. Using the unsupervised learning model, a service type may be labeled to the communication status and then the supervised learning model may be derived assuming the label from unsupervised learning model is correct.

In embodiments, a supervised learning method may use the unsupervised learning output as ground truth (e.g., after filtering) to derive a relatively simpler decision boundary. A supervised learning model utilizes relatively fewer computations to classify a service type and classification may be made with little or no delay. In embodiments, when a fast classification is desired, the supervised learning model may use the first a few samples from each segment of the communication status data. Supervised learning may include linear discriminant methods, support vector machine methods, nearest neighbor methods, random forest methods, and other classification algorithms. Conversely, when a low complexity classifier is desired, e.g., a linear discriminant method may be used at the expense of accuracy.

Figure 2A:
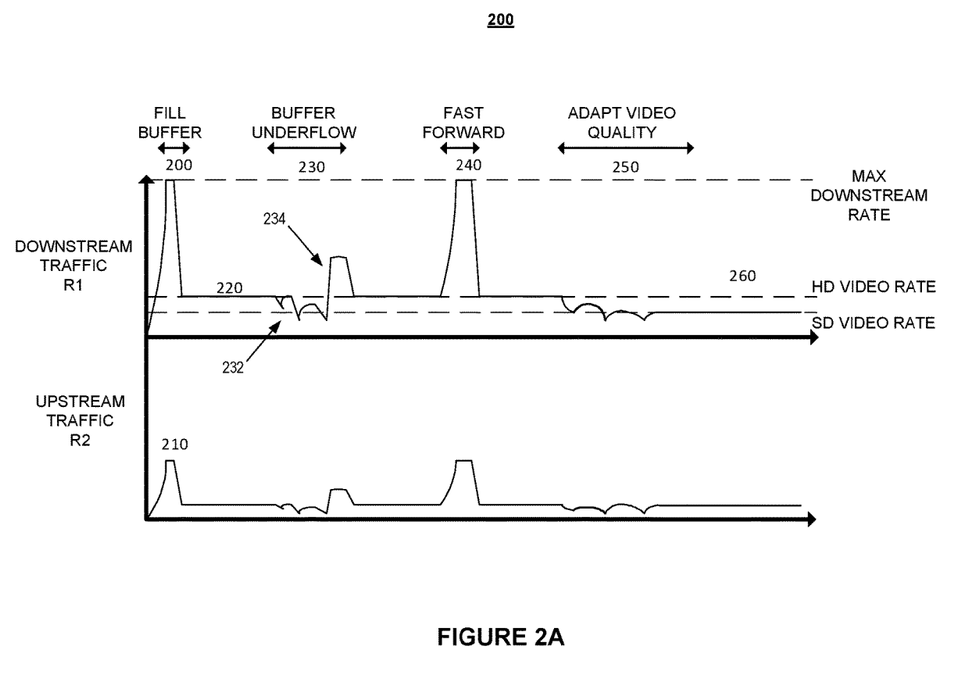
FIG. 2A illustrates exemplary communication status patterns comprising traffic usage and communication characteristics according to various embodiments of the present disclosure.

In embodiments, learn classifier unit 310 may learn the quality of users' experience and service type based on the number of bytes transmitted and received to and from the station. FIG. 2A illustrates exemplary communication status patterns comprising traffic usage and communication characteristics according to various embodiments of the present disclosure. Graphs R1 and R2 in FIG. 2A represent respective downstream and upstream speeds of, e.g., transmitted bytes when a station uses a streaming video service. Absent network problems, the graphs would show a train of bursts of packets transmitted at regular periods that may be used to identify the service type as streaming video. However, when cross traffic is present in some parts of the network or when Wi-Fi/broadband speed is temporarily degraded, the downstream traffic rate R1 may be reduced, thus, potentially negatively impacting service type discovery.

As shown in FIG. 2A, when streaming from a streaming server begins 200, a relatively large amount of downstream traffic fills a receiver buffer. If packets transmitted during time period 200 carry payload data, the average packet size may be close to the maximum Ethernet packet size, e.g., 1500 bytes. Because the streaming in FIG. 2A uses TCP, the station transmits acknowledgement packets back to the streaming server. Such upstream transmission is represented by short burst 210. It is noted that since upstream packets that are acknowledgement packets generally do not carry data, and their average packet size is relatively smaller than those for downstream transmission.

If streaming uses UDP, as in IPTV, the amount of upstream data transmission and the number of upstream data packets are typically much lower. As a result, the ratio of downstream to upstream transmission increases. If station uses VoIP or video conferencing, the amount of upstream to downstream transmission is similar, resulting in a relatively low downstream to upstream transmission ratio. In addition, if the station uses VoIP, the amount of data usage is relatively smaller than for video conferencing. Therefore, in embodiments, information comprising upstream/downstream transmission rates, upstream/downstream transmission rate ratios, the absolute number of upstream/downstream packets, and other traffic usage information may advantageously be utilized to identify a particular service type.

As depicted in FIG. 2A, once the receiver buffer has been filled, the streaming server may transmit packets close to video source rate 220. Assuming a certain degree of packet loss, e.g., in the communication channel, within time period 230, the amount of transmitted bytes to the station may fluctuate 232, followed by a burst 234 of high-rate downstream transmission to refill the buffer. Therefore, in embodiments, fluctuation 232 of a transmission rate followed by a burst of high-rate downstream transmission may be interpreted and used as an indication of a potential QoE degradation. This may be distinguished from a scenario where a burst is not immediately preceded by some fluctuation, i.e., when a user fast-forwards 240 a streaming video, typically, the buffered data is flushed and refilled with new data. Therefore, a large amount of downstream traffic 240 occurs to refill the receiver buffer following such fast-forward 240 event.

Similarly, if the channel bandwidth is reduced, e.g., due to a congestion or communication problem 250, this may cause the streaming server to change video quality from a HD video rate to an SD video rate, such that the amount of downstream transmission, R1, is reduced to a different, lower rate, here, the SD source rate. Therefore, in embodiments, a transmission rate change from HD to SD may be used to identify a potential QoE degradation. In addition to network traffic usage, in embodiments, communication characteristics may be used, e.g., by a learn classifier discussed with reference to FIG. 3, in order to improve service type recognition.

Figure 2B:
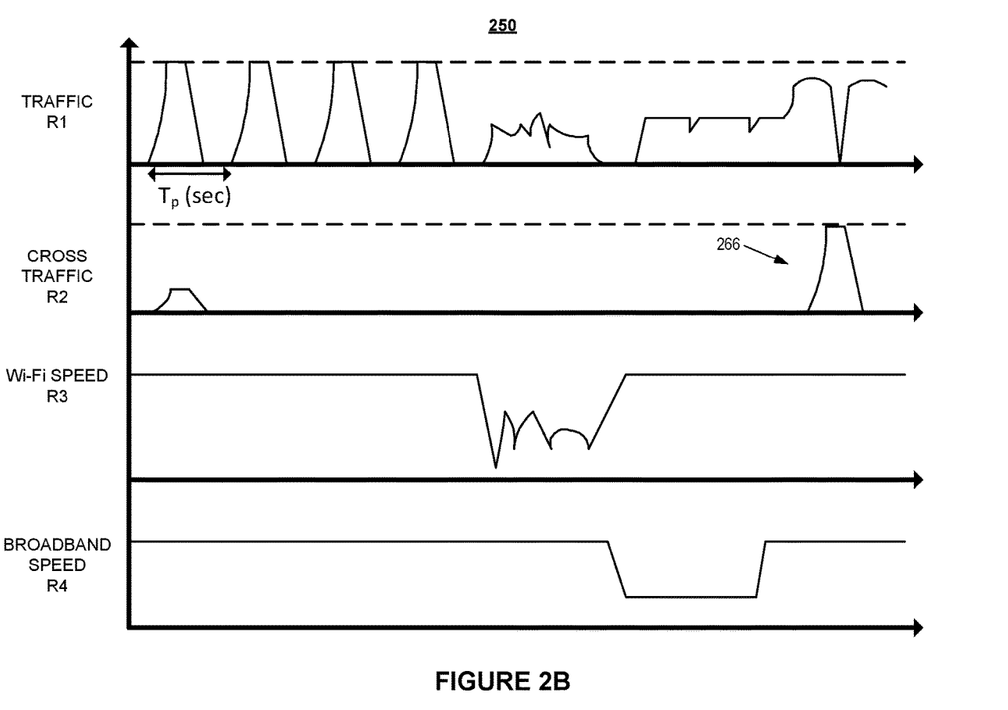
FIG. 2B illustrates the communication characteristics and traffic usage when a station uses a type of streaming video with finer time scale than used in FIG. 2A.

FIG. 2B illustrates the communication characteristics and traffic usage when a station uses a type of streaming video with finer time scale than used in FIG. 2A. Similar to FIG. 2A, at steady state, traffic usage may be constant and comprise regular traffic burst, e.g., having a period $T_p$. In scenarios where a relatively large amount of cross traffic 266 occurs, this may result in traffic usage being significantly reduced. The resulting change in traffic behavior may cause a service type classifier to falsely detect a change in the service type. Therefore, in embodiments, cross traffic 266 in the AP may be monitored based on the traffic usage of other stations, such that the service type classifier may use cross traffic as one of its features and discard traffic usage collected in the presence of large cross traffic that, otherwise, may lead to an erroneous classification.

Similarly, a fluctuation 270 of Wi-Fi speed, e.g., due to interference, or the fluctuation 280 of broadband speed due to a noisy access network is likely to change the traffic usage and, thus, negatively impact the performance of the service type classifier. Therefore, in embodiments, a service type recognizer may use broadband and/or Wi-Fi speed as one of its features to, advantageously, reduce erroneous classifications.

In embodiments, service type recognizer 380 inputs features provided by communication status acquisition unit 370 to the classification model learned by learn classifier unit 310 in order to recognize the type of service. In embodiments, the output of service type recognizer 380 is provided to communication status acquisition unit 370, such that an event trigger in communication status acquisition unit 370 may use the service type to optimize the trigger threshold. For example, if the station uses no service, the threshold for the event detection based on the number of downstream bytes is relatively small compared to a threshold when the station uses HD streaming video service.

Figure 4:
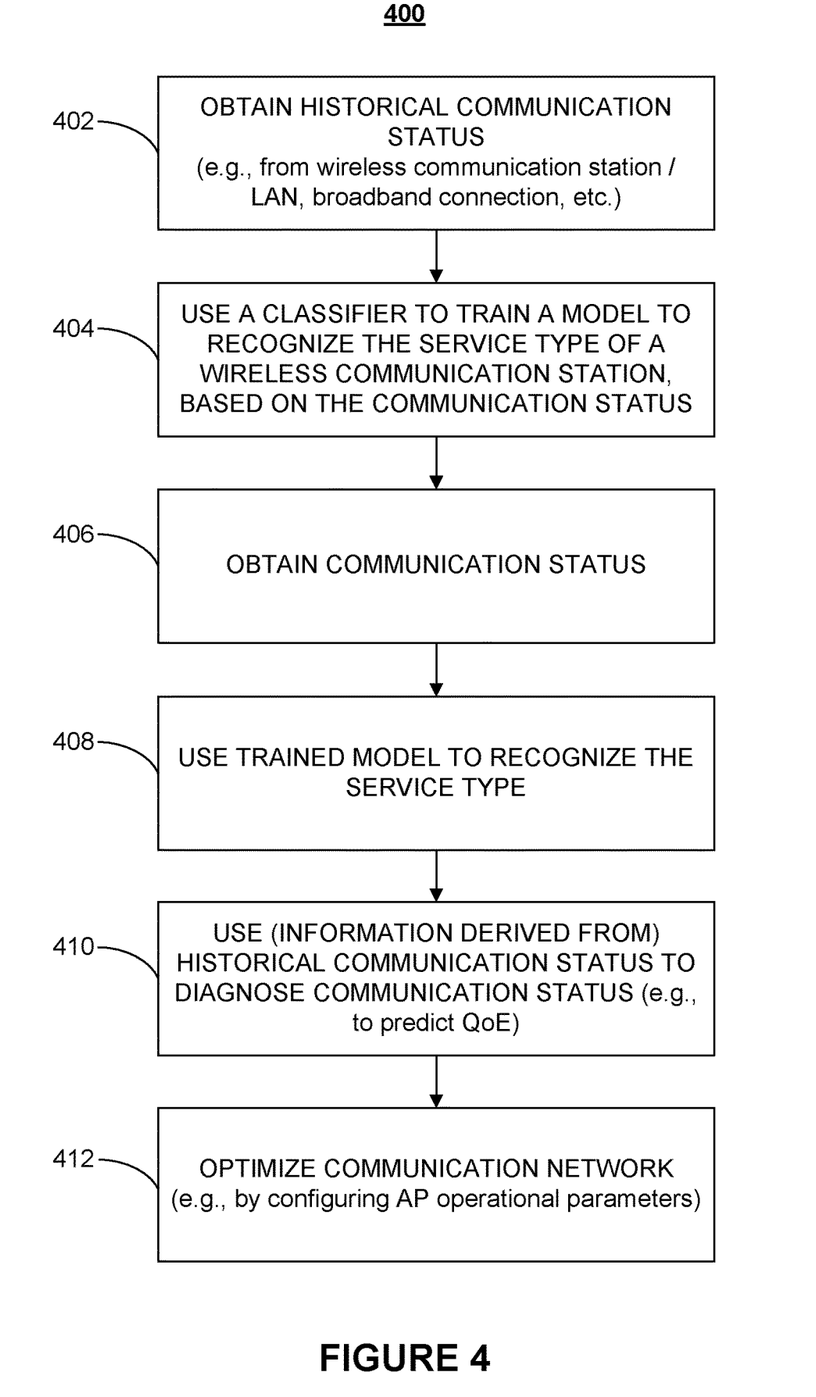
FIG. 4 is a flowchart of an illustrative process for recognizing service types in accordance with various embodiments of the present disclosure.

FIG. 4 is a flowchart of an illustrative process for recognizing service types in accordance with various embodiments of the present disclosure. Process 400 begins at step 402 when a historical communication status is obtained, e.g., from a wireless communication station, a wireless LAN, a broadband connection, and the like.

At step 404, a classifier may be used to train a model that recognizes the service type of a wireless communication station, etc., based on the obtained communication status.

At step 406, a communication status is obtained.

At step 408, the model trained at step 404 may be used to recognize the service type.

At step 410, the historical communication status, or any information derived therefrom, may be used to diagnose the communication status, e.g., to predict a QoE.

At step 410, based on at least some of the data, a communication network may be optimized, e.g., by configuring AP operational parameters.

One skilled in the art shall recognize that: (1) certain steps may optionally be performed; (2) steps may not be limited to the specific order set forth herein; (3) certain steps may be performed in different orders; and (4) certain steps may be done concurrently.

Figure 5:
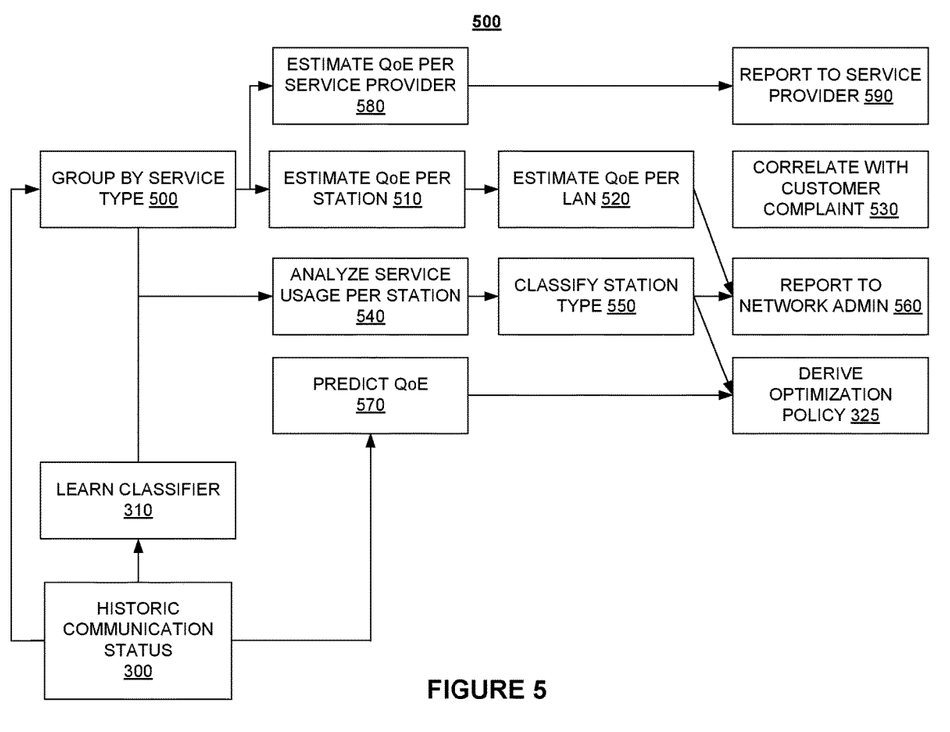
FIG. 5 is a flowchart of an illustrative network diagnostic process as performed in accordance with various embodiments of the present disclosure.

FIG. 5 is a flowchart of an illustrative network diagnostic process in accordance with various embodiments of the present disclosure. In embodiments, process 500 may be performed by the network diagnostics unit shown in FIG. 3. In embodiments, network diagnostic unit 320 may use both recognized service types and communication status received from database 305, e.g., to diagnose the communication interfaces in an AP. In embodiments, service usage per station 540 may be analyzed, e.g., by grouping recognized service types by station, and the station type (e.g., TV, smart phone, etc.) may be classified 550, e.g., based on service usage statistics. As an example, the device type of a station may be classified as a TV device type if the most dominant traffic type is measured as IPTV, web-browsing traffic is relatively rare, and the MAC address of the station can be associated with a TV manufacturer. In another example, the device type of a station may be classified as a smart phone device type if VoIP and streaming video services are detected, and the MAC address of the station is associated with a smartphone manufacturer. In yet another example, the device type of a station may be classified as an IoT (Internet of things) device type if only unidentifiable services are detected.

In embodiments, network diagnostic unit 320 may use both recognized service type and communication status received from database 305 to estimate the quality of experience (QoE) of a service type for each station. This QoE analysis may use the service type that the user of the station actually used, such that the estimated QoE may be correlated, e.g., in connection with a customer complaint so as to be able to identify the root cause of such a call. In embodiments, the QoE of a service type may be analyzed by first grouping the communication status by service type 500 and then analyzing the grouped communication status to estimate 510 the QoE per station. As previously mentioned, communication status may be aggregated over different time durations for different use cases. For example, if a customer reported an exact time of a QoE degradation, aggregation should occur over a short period of time that corresponds to the time resolution that the customer reported the QoE problem.

As another example, if the QoE is used to predict customer churn (an event when a user cancels service), the aggregation should be taken over a relatively long time period, e.g., days. When a station uses streaming video, the estimated QoE of the video is a function that decreases with packet loss rate and delay/latency jitter, and increases with link transmission rate. The estimated QoE of streaming video further decreases with the number of buffer underflow events and increases with the number of transmitted bytes. The estimated QoE of VoIP decreases with latency, packet loss rate, and irregularity of traffic usage, wherein the irregularity may be measured as the variance in the number of packets or transmitted bytes.

The QoE of a service type may be analyzed for each network interface by aggregating the QoE of the service of all stations connected to a particular network interface. For example, to provide an overall QoE for a network interface to which a several stations connect to use several different services, the QoE may be aggregated over all such stations. The network interface may comprise guest wireless LAN interface, 2.4 GHz wireless LAN interface, 5/6 GHz wireless LAN interface, wired LAN interface, and other network interfaces that provide connection between a station and an AP that comprises several network interfaces.

In embodiments, the broadband QoE of a service type may be analyzed by grouping the communication status by the service type and analyzing the grouped communication status without using LAN communication characteristics. In embodiments, the LAN QoE of a service type may be analyzed by grouping the communication status by service type and analyzing the grouped communication status without using broadband network communication characteristics.

In embodiments, the estimated QoE per station 510 and/or service usage per station may be reported to a network administrator or administration software, which may comprise a broadband service provider's operational support system, AP management software, AP management website, and other software that may provide network operational information to an end-user and/or network operator. In embodiments, the report may be implemented as an API hosted in the server. Examples of APIs comprise Restful, web service, database, and other methods that allow access of QoE data to a network administrator. In embodiments, the reported QoE and/or service usage per station may be correlated with customer complaint records to help identify the cause of user complaint(s).

In embodiments, the correlation method may comprise computing the probability of receiving a customer complaint given the QoE that has been estimated by using the communication status collected during the period of time when the customer experienced a network problem. The customer complaint record may be correlated with the broadband QoE and with the LAN QoE to determine the portion(s) of a network that may have given rise to the customer complaint. In embodiments, the service usage per station type may be reported to a network administrator, e.g., by aggregating the service usage per station. The service usage per station type may be useful information for network planning. In embodiments, the QoE of a service of a service provider may be analyzed by examining the grouped communication status in response to detecting the provided service. For example, the performance of IPTV that an ISP may provide to several customers may be aggregated over all those customers to provide the ISP with an assessment or estimate of the ISP's QoE service.

In embodiments, a hypothetical QoE 572 of a service type may be computed, e.g., by a predict QoE unit that uses the communication status of a station to predict the station's achievable QoE if the station uses that service. Unlike the estimated QoE that uses service type, predicted QoE 572 need not use the actual service type that was used at the station when the communication status was collected because the purpose of the hypothetical QoE 572 of a service type is to predict the QoE if the service type is used under the similar communication status in the future, so hypothetical QoE 572 may also be called predicted QoE 572.

In embodiments, predicted QoE 572 may be used to optimize the AP's configuration, e.g., operational parameters, when the communication characteristics changes over time. In embodiments, the algorithm used in predict QoE unit 570 may be identical to the algorithms used in estimate QoE per station unit 510, except that the data supplied to the predict QoE unit 570 is not grouped by service type.

Figure 6:
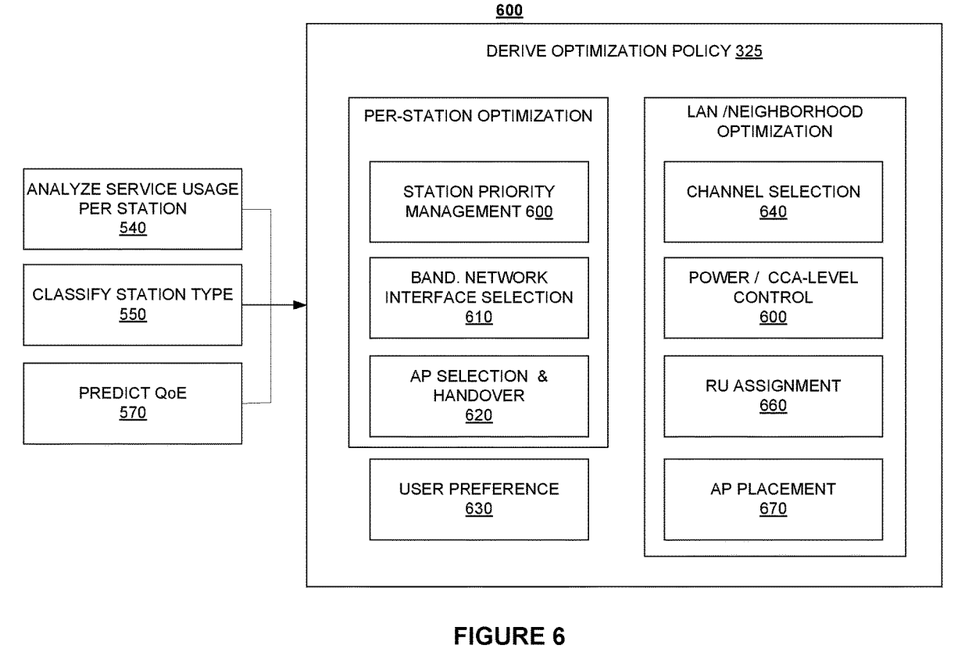
FIG. 6 is a flowchart that illustrates how an optimization policy may be derived in accordance with various embodiments of the present disclosure.

FIG. 6 is a flowchart that illustrates how an optimization policy may be derived in accordance with various embodiments of the present disclosure. In embodiments, the operational parameters of the AP may be optimized using the historic communication status and/or information derived from the historic communications status in profile optimization unit 325 that was discussed with reference to FIG. 5. As shown in FIG. 6, information derived from the historic communications status may comprise predicted QoE 570, station type/usage 540, 550, and user preferences 630, which may be set by an end-user of the AP.

In embodiments, a profile that may comprise a collection of rules that determine, based on the communication status and/or information derived therefrom, a number of operational parameters of the AP. In embodiments, the profile may be optimized for each station, e.g., if the operational parameters can be applied without affecting other stations. The operational parameters optimized for each station may comprise a station's priority, frequency band or network interface, handover to different APs, and other operational parameters that may be individualized optimized, i.e., independent of other stations.

In embodiments, the rules in the profile for network optimization may comprise a rule that directs 610 a station to a particular network interface. Such a rule may stipulate that a station should connect to a network interface with a relatively high bandwidth and short range (low coverage) if the station uses services that demand relatively high bandwidth, such as IPTV and video streaming. Exemplary network interfaces with high bandwidth and short range comprise 5/6 GHz band Wi-Fi and 60 GHz band Wi-Fi.

The rules in the profile for network interface selection may comprise a rule for selecting the network interface with the highest predicted QoE of the service type that matches the service that the station uses if the predicted QoE for each network interface is available. The rules may further include a rule to select a network interface having a frequency band with a long range if the station uses a service where a user frequently moves while using the service, such as VoIP, streaming music, and video conferencing. The network interface with frequency band with long range is 2.4 GHz band Wi-Fi, 900 MHz band Wi-Fi, 900 MHz band ZigBee, 2.4 GHz band ZigBee, and 2.4 GHz band Bluetooth.

In embodiments, the profile for network optimization may comprise rules for handover from the serving AP, i.e. the AP to which the station is currently connected, to other APs in 620. Target APs for handover may comprise, e.g., APs/range extenders in the same house, neighboring APs with guest access, and cellular base stations. A handover decision may involve a rule for selecting a closest AP, i.e., the AP having the highest signal strength, and/or a repeater, e.g., if the station uses or is predicted to use bandwidth-demanding services such as IPTV and video streaming. The profile for handover may also comprise a rule for selecting an AP with the highest signal strength to the station (i.e., main AP) or cellular base station if the station uses a service that may involve frequent movements, such as VoIP, streaming music, and video conferencing.

In embodiments, the profile for network optimization may comprise rules for prioritizing various stations. An AP may employ different ways of enforcing priorities. For example, the AP may block access from a certain type of station for a certain duration. In other example, the AP may use a different EDCA priority queue for the traffic destined to a station to provider faster access to the prioritized station. In yet another example, the AP may apply traffic shaping to the traffic destined to deprioritized stations. The rules in the profile for station priority may further comprise a rule to prioritize the station if the station uses a service that requires low latency such as VoIP, video conferencing, and IPTV. In embodiments, the rules in the profile for station priority may comprise a rule to block or deprioritize network access from a station that uses a type of service that is blocked or deprioritized in a user preference. Moreover, the rules in the profile for station priority may comprise a rule to block or to deprioritize the network access from a station that is coupled to a guest network interface if the station connected to the network interface uses services that consume a high bandwidth, such as IPTV or streaming video.

In embodiments, the profile of operational parameters may be optimized for each network interface. The operational parameters optimized for each network interface may comprise channel, transmit power of the AP, clear-channel-assessment level of the AP, resource unit allocation, the location of the AP, and other operational parameters which affect all stations connected to the network interface.

In embodiments, the profile of optimal operational parameters may comprise rules for selecting an optimal channel for each network interface. The rules for channel selection may comprise a rule to select the channel having the highest weighted average predicted QoE for a station, where weight maybe derived based on user preference and service usage. The rules for channel selection may further comprise a rule to select the channel with the highest predicted QoE for a station which is prioritized in user preference 630. The rules in the profile for channel selection may also comprise a rule to select the channel with the highest predicted QoE of the type of service that is prioritized in user preference 630.

In embodiments, the profile of optimal operational parameters may comprise rules to determine an optimized AP placement. The rules in the profile for AP placement may comprise a rule to recommend replacing an existing AP with an AP having improved capabilities if the QoE of the type of service that is prioritized in the user preference is below a threshold. The rules in the profile for AP placement may comprise a rule to recommend replacing the AP if the QoE of the type of service that is most heavily used by the station preferred in the user preference is below a threshold.

In embodiments, the profile of optimal operational parameters may comprise rules to control the optimal transmit power, the clear-channel-assessment (CCA) threshold, RU (resource unit) assignment, and other network interface configuration parameters that may affect neighboring APs. The CCA threshold is the maximum received power that a channel is deemed clear to send. For example, if CCA is set high, a Wi-Fi station can transmit when a neighboring Wi-Fi station transmits on the channel, which allows better channel utilization when many Wi-Fi stations share the channel. However, if CCA is set high, the quality of service may be degraded because communication involves increases packet losses. The CCA threshold may be dynamically adjusted per 802.11ax Wi-Fi standard unlike other legacy Wi-Fi standards. The RU is a chunk of OFDM subcarriers over certain time that is assigned for the communication between an AP and a station. If the RU is not used in an AP, the neighboring APs may use this empty RU without any interference. The rules in the profile for power control may include a rule to lower the transmit power of an AP if a station connected to a neighboring AP uses a type of service that is favored in user preference 630 and/or if the services used by the stations connected to the AP does not require a high transmission rate or low latency. The rules in the profile for power control may comprise a rule to decrease the CCA threshold of an AP if a station connected to a neighboring AP uses a type of service that is favored in user preference 630 and/or if the services used by the stations connected to the AP do not require a high transmission rate or low latency. The rules in the profile for RU assignment of an AP may comprise a rule to avoid certain RUs used by a station that uses high QoE-demanding service and is connected to a neighboring AP. In embodiments, to apply these rules, the AP obtains the knowledge of the service type used by stations in neighboring APs. Since the server can obtain such information from neighboring APs, the server may directly command the AP to apply an optimized communication configuration instead of first optimizing the profile.

Figure 7:
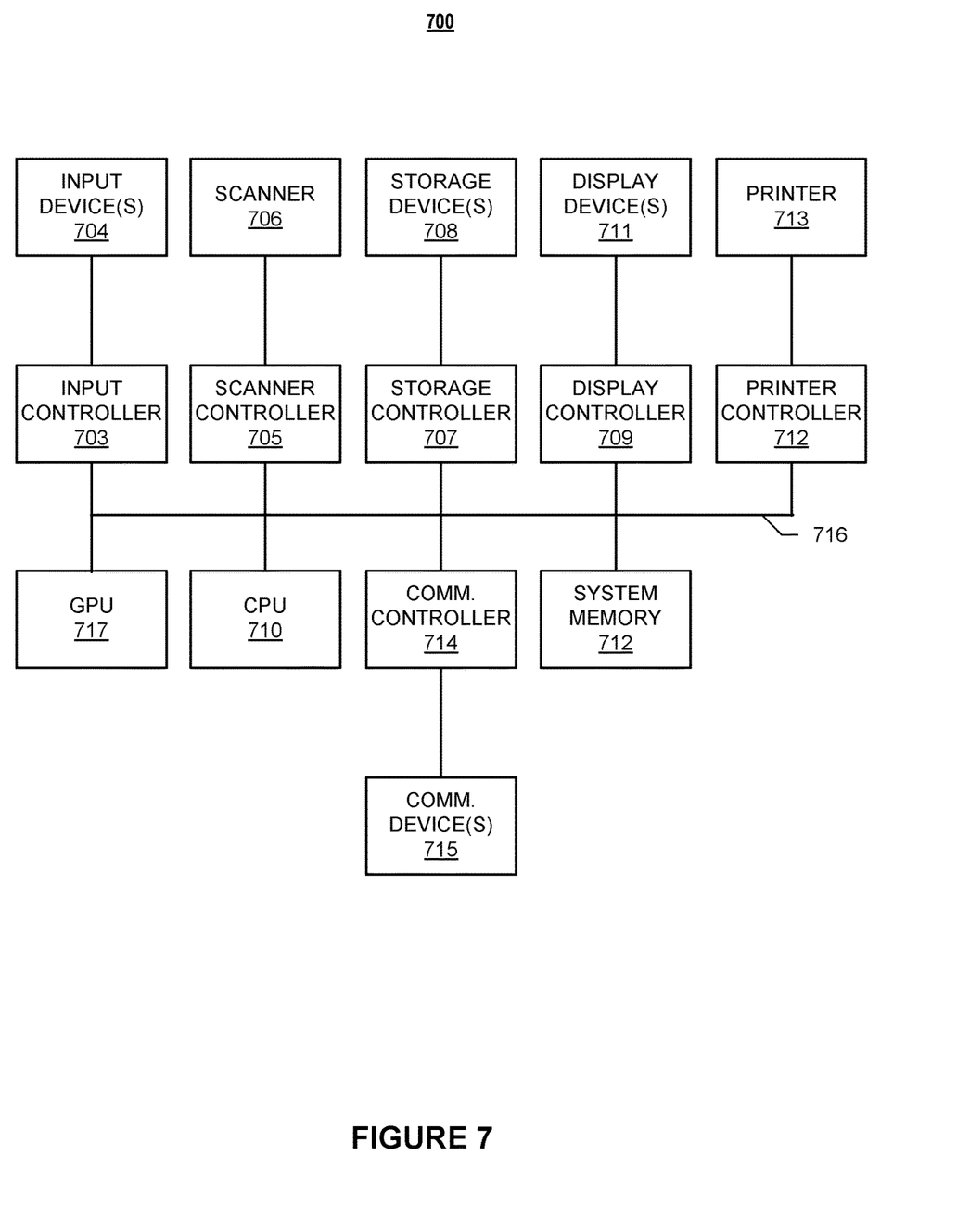
FIG. 7 depicts a simplified block diagram of a computing device/information handling system, in accordance with embodiments of the present disclosure.

FIG. 7 depicts a simplified block diagram of a computing device/information handling system, in accordance with embodiments of the present disclosure. FIG. 7 depicts a simplified block diagram of a computing device/information handling system (or computing system) according to embodiments of the present disclosure. It will be understood that the functionalities shown for system 700 may operate to support various embodiments of a computing system—although it shall be understood that a computing system may be differently configured and include different components, including having fewer or more components as depicted in FIG. 7.

As illustrated in FIG. 7, the computing system 700 includes one or more central processing units (CPU) 701 that provides computing resources and controls the computer. CPU 701 may be implemented with a microprocessor or the like, and may also include one or more graphics processing units (GPU) 719 and/or a floating-point coprocessor for mathematical computations. System 700 may also include a system memory 702, which may be in the form of random-access memory (RAM), read-only memory (ROM), or both.

A number of controllers and peripheral devices may also be provided, as shown in FIG. 7. An input controller 703 represents an interface to various input device(s) 704. The computing system 700 may also include a storage controller 707 for interfacing with one or more storage devices 708 that might be used to record programs of instructions for operating systems, utilities, and applications, which may include embodiments of programs that implement various aspects of the present invention. Storage device(s) 708 may also be used to store processed data or data to be processed in accordance with the invention. The system 700 may also include a display controller 709 for providing an interface to a display device 711, which may be a cathode ray tube (CRT), a thin film transistor (TFT) display, organic light-emitting diode, electroluminescent panel, plasma panel, or other type of display. The computing system 700 may also include one or more peripheral controllers or interfaces 705 for one or more peripherals. Example of peripheral may include one or more printers, scanners, input devices, output devices, sensors, and the like. A communications controller 714 may interface with one or more communication devices 715, which enables the system 700 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable media.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using application specific integrated circuits (ASICs), programmable arrays, digital signal processing circuitry, or the like. Accordingly, the terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks; optical media such as CD-ROMs and holographic devices; magneto-optical media; and hardware devices that are specially configured to store or to store and execute program code, such as ASICs, programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A communication system for improving operation of a communication network, the communication system comprising:
   a communication apparatus in the communication network, the communication apparatus comprising a processor and a non-transitory computer-readable medium that comprises instructions that, when executed by the processor, cause steps to be performed comprising:
   inputting a current communication status to a service type recognizer to recognize a service type, the service type recognizer is a learned classifier trained, using one or more historical communication statuses or information derived therefrom, to recognize one or more service types of the communication apparatus by mapping the historical communication status to the one or more service types; and
   diagnosing, using at least the recognized service type, an operation of the communication network.

2. The communication system of claim 1, wherein the historical communication status comprises at least one of:
   a traffic usage of the communication apparatus; and
   a metric that quantifies a communication characteristic independent of the traffic usage.

3. The communication system of claim 2, wherein the traffic usage comprises the bandwidth consumption of the communication apparatus.

4. The communication system of claim 2, wherein the communication characteristic comprises one or more of:
   a receive signal strength indicator (RSSI);
   a transmission rate;
   a round-trip-time (RTT);
   one-way delay;
   queue state; and
   a location of a communication sender/receiver.

5. The communication system of claim 1 further comprising:
   deriving, using a result from the diagnosing and the recognized service type, a profile that comprises a set of rules that are used to determine an improved configuration for operating one or more access points in the communication network.

6. The communication system of claim 5, wherein the set of rules comprise a rule of using a max/min receive signal strength indicator (RSSI) to determine an access point, among the one or more access points, for connection.

7. The communication system of claim 5 further comprising:
   applying the improved configuration to one or more communication interfaces to enable improved operation of the communication network.

8. The communication system of claim 7, wherein the one or more communication interfaces comprise one or more of:
   a broadband interface;
   a wired LAN interface;
   a wireless guest network interface;
   a low-frequency wireless network interface; and
   a high-frequency wireless network interface.

9. A Method for improving operation of a communication network, the method comprising:
   receiving, at communication status acquisition unit in a communication apparatus within the communication network, a current communication status;
   recognizing, using a service type recognizer in the communication apparatus, a service type, the service type recognizer is a learned classifier trained, using a historical communication status or information derived therefrom, to recognize one or more service types of the communication apparatus by mapping the historical communication status to the one or more service types; and
   diagnosing, using at least the recognized service type, an operation of the communication network.

10. The method of claim 9 further comprising:
deriving, using a result from the diagnosing and the recognized service type, a profile that comprises a set of rules that are used to determine an improved configuration for operating one or more access points in the communication network.

11. The method of claim 10, wherein the set of rules comprise a rule of using a max/min receive signal strength indicator (RSSI) to determine an access point, among the one or more access points, for connection.

12. The method of claim 10 further comprising:
applying the improved configuration to one or more communication interfaces to enable improved operation of the communication network.

13. The method of claim 12, wherein the one or more communication interfaces comprise one or more of:
a broadband interface;
a wired LAN interface;
a wireless guest network interface;
a low-frequency wireless network interface; and
a high-frequency wireless network interface.

14. The method of claim 9, wherein the historical communication status comprises at least one of:
a traffic usage of the communication apparatus; and
a metric that quantifies a communication characteristic independent of the traffic usage.

15. The method of claim 14, wherein the communication characteristic comprises one or more of:
a receive signal strength indicator (RSSI);
a transmission rate;
a round-trip-time (RTT);
one-way delay;
queue state; and
a location of a communication sender/receiver.

16. A non-transitory computer-readable medium or media comprising one or more sequences of instructions which, when executed by at least one processor, causes steps for improving operation of a communication network comprising:
receiving, at communication status acquisition unit in a communication apparatus within the communication network, a current communication status;
recognizing, using a service type recognizer in the communication apparatus, a service type, the service type recognizer is a learned classifier trained, using a historical communication status or information derived therefrom, to recognize one or more service types of the communication apparatus by mapping the historical communication status to the one or more service types; and
diagnosing, using at least the recognized service type, an operation of the communication network.

17. The non-transitory computer readable medium or media of claim 16 further comprising one or more sequences of instructions which, when executed by at least one processor, causes steps to be performed comprising:
deriving, using a result from the diagnosing and the recognized service type, a profile that comprises a set of rules that are used to determine an improved configuration for operating one or more access points in the communication network.

18. The non-transitory computer readable medium or media of claim 17, wherein the set of rules comprise a rule of using a max/min receive signal strength indicator (RSSI) to determine an access point, among the one or more access points, for connection.

19. The non-transitory computer readable medium or media of claim 17, wherein further comprising one or more sequences of instructions which, when executed by at least one processor, causes steps to be performed comprising:
applying the improved configuration to one or more communication interfaces to enable improved operation of the communication network.

20. The non-transitory computer readable medium or media of claim 19, wherein the one or more communication interfaces comprise one or more of:
a broadband interface;
a wired LAN interface;
a wireless guest network interface;
a low-frequency wireless network interface; and
a high-frequency wireless network interface.

* * * * *